(12) United States Patent
Taketani et al.

(10) Patent No.: US 8,081,420 B2
(45) Date of Patent: Dec. 20, 2011

(54) SOLID ELECTROLYTIC CAPACITOR AND METHOD FOR MANUFACTURE THEREOF

(75) Inventors: Yutaka Taketani, Osaka (JP); Yoshiaki Hasaba, Osaka (JP); Makoto Sakamaki, Osaka (JP); Tadahito Ito, Osaka (JP)

(73) Assignee: SUN Electronic Industries Corp., Osaka (JP)

( * ) Notice: Subject to any disclaimer, the term of this patent is extended or adjusted under 35 U.S.C. 154(b) by 204 days.

(21) Appl. No.: 12/691,338

(22) Filed: Jan. 21, 2010

(65) Prior Publication Data

US 2011/0096467 A1    Apr. 28, 2011

(30) Foreign Application Priority Data

Oct. 27, 2009  (JP) .................................. 2009-246691

(51) Int. Cl.
    *H01G 9/04*    (2006.01)
(52) U.S. Cl. ........ 361/528; 361/523; 361/525; 361/517; 361/519; 29/25.01; 29/25.03
(58) Field of Classification Search .................. 361/528, 361/516, 517–519, 523, 525, 529–530, 540–541; 29/25.01, 25.03
    See application file for complete search history.

(56) References Cited

U.S. PATENT DOCUMENTS

| | | | |
|---|---|---|---|
| 5,349,496 A * | 9/1994 | Taniguchi et al. ............ | 361/528 |
| 6,906,913 B2 * | 6/2005 | Kochi et al. .................... | 361/529 |
| 6,914,770 B1 * | 7/2005 | Goldberger .................... | 361/528 |
| 7,295,425 B2 * | 11/2007 | Suenaga et al. ............... | 361/523 |
| 7,349,198 B2 * | 3/2008 | Yano et al. ..................... | 361/524 |
| 7,511,944 B2 * | 3/2009 | Kuriyama ..................... | 361/535 |
| 7,929,274 B2 * | 4/2011 | Reed et al. .................... | 361/528 |

FOREIGN PATENT DOCUMENTS

| | | |
|---|---|---|
| JP | 05-136009 A | 6/1993 |
| JP | 2005-045235 A | 2/2005 |

* cited by examiner

*Primary Examiner* — Nguyen T Ha (74) *Attorney, Agent, or Firm* — Morgan, Lewis & Bockius LLP (57) ABSTRACT

On a surface of an anode member 12 having a valve action, a cathode layer 14 is formed, and at a terminal lead-out face 12a at one end of the anode member 12, an anode wire 16 is led out of it; thus a capacitor element 10 is formed. An anode terminal 4 is joined to the anode wire 16. A cathode terminal 5 is joined to the cathode layer 14. A protective layer 2 of resin covers part or all of the capacitor element 10. A packaging member 3 of resin harder than the protective layer 2 covers around the capacitor element 10 including the protective layer 2 and the anode wire 16 to form a package. The protective layer 2 has a larger linear expansion coefficient than the packaging member 3. The mass ratio of the packaging member 3 to the total mass of the packaging member 3 and the protective layer 2 between the terminal lead-out face 12a and the exterior face of the packaging member 3 opposite the terminal lead-out face 12a is 50% or more.

8 Claims, 4 Drawing Sheets

SOLID ELECTROLYTIC CAPACITOR AND METHOD FOR MANUFACTURE THEREOF

This application is based on Japanese Patent Application No. 2009-246691 filed on Oct. 27, 2009, the contents of which are hereby incorporated by reference.

BACKGROUND OF THE INVENTION

1. Field of the Invention

The present invention relates to a solid electrolytic capacitor in which a capacitor element having a cathode layer formed on a surface of an anode member having a valve action is covered by resin, and also relates to a method for manufacturing such a solid electrolytic capacitor.

2. Description of Related Art

Figure 4:
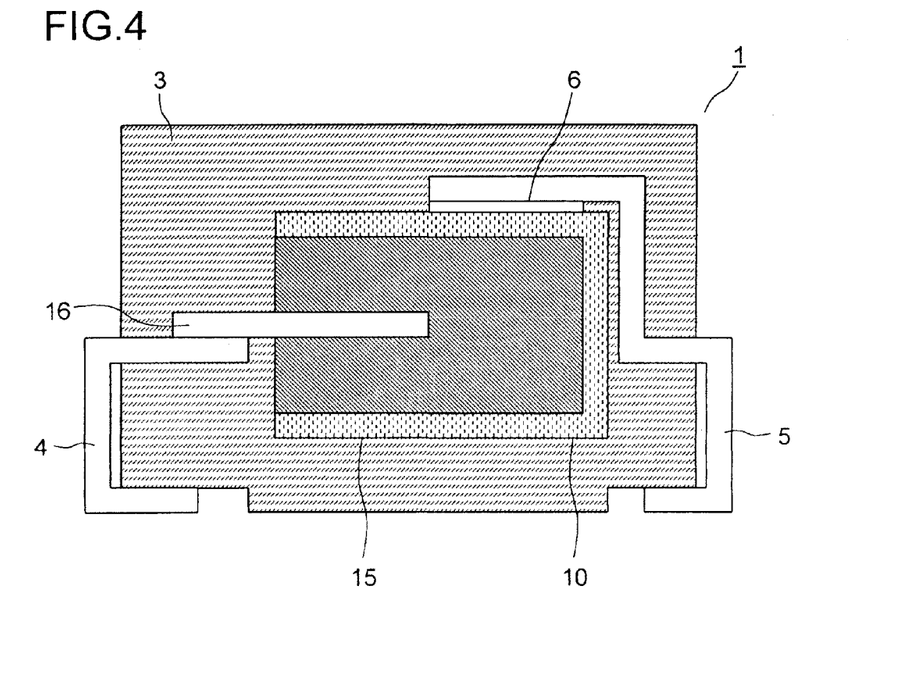
FIG. 4 is a front sectional view of a conventional solid electrolytic capacitor.

A conventional solid electrolytic capacitor is disclosed in JP-A-2005-45235. FIG. 4 is a front sectional view of that solid electrolytic capacitor. The solid electrolytic capacitor 1 has a capacitor element 10 in which a surface of an anode member molded of a valve-action metal is covered with a cathode layer formed of a solid electrolytic layer. Around the cathode layer, a cathode draw-out layer 15 is formed. At one face of the anode member, an anode wire 16 is led out of it, and the anode wire 16 is joined, by welding or the like, to an anode terminal 4 formed of a lead frame or the like. To the cathode draw-out layer 15, a cathode terminal 5 formed of a lead frame or the like is joined via an adhesive layer 6 of silver paste or the like.

The capacitor element 10, along with the anode wire 16, is covered by a packaging member 3 formed of hard resin such as epoxy resin. The packaging member 3 is transfer-molded, by being injected in a melted state into a cavity inside a mold in which the capacitor element 10 is placed, so as to mold the capacitor element 10 and then harden. At this time, the shock resulting from resin injection for the transfer molding of the packaging member 3 acts upon the capacitor element 10, and thus the capacitor element 10 receives mechanical stress. The capacitor element 10 also receives mechanical stress resulting from the contraction of the packaging member 3 during its hardening.

Exposing the capacitor element 10 to mechanical stress results in significantly increased leakage current. The capacitor element 10 then needs to be repaired by being subjected to a so-called aging process in which a voltage is applied to the capacitor element 10 at high temperature. If, however, the damage at the time of molding is severe, repair by aging is difficult, leading to diminished yields due to short circuiting and unduly large leakage current.

Even after the solid electrolytic capacitor 1 is finished as an end product, when a user solders the anode and cathode terminals 4 and 5 by reflow soldering or the like, the packaging member 3 expands and contracts abruptly. This causes the capacitor element 10 of the solid electrolytic capacitor 1, which has undergone an aging process, to receive mechanical stress again, leading to the problem of increased leakage current.

Figure 5:
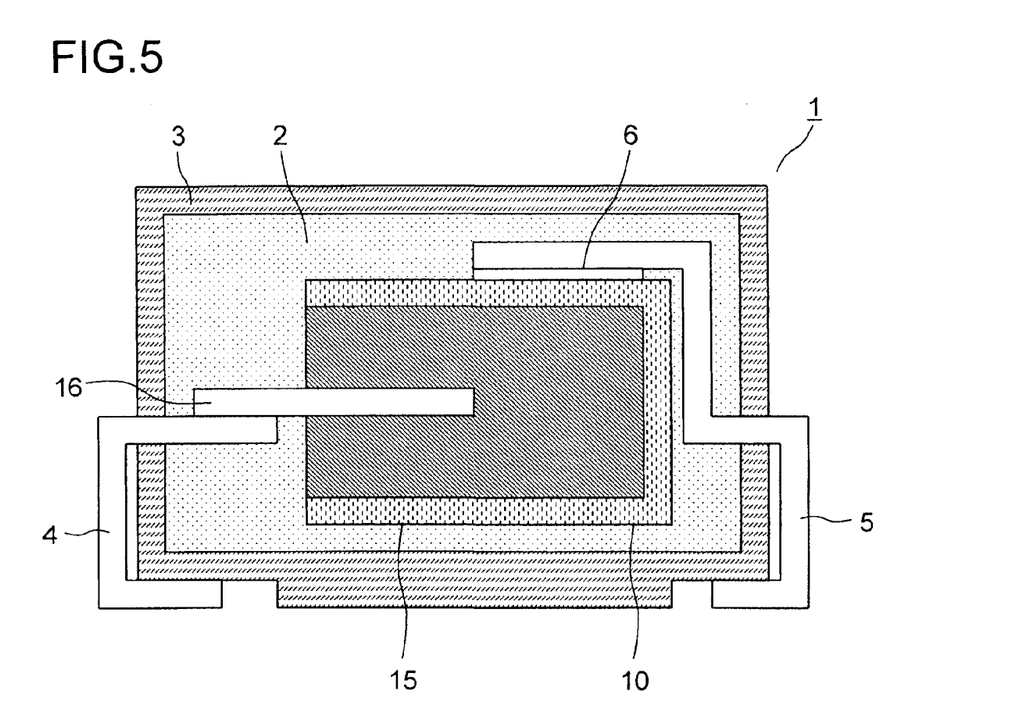
FIG. 5 is a front sectional view of another conventional solid electrolytic capacitor.

To solve these problems, JP-A-H5-136009 discloses a solid electrolytic capacitor in which a protective layer (shock-absorbing layer) is provided between the packaging member 3 and the capacitor element 10. FIG. 5 is a front sectional view of that solid electrolytic capacitor. In this figure, such parts as find their counterparts in FIG. 4 described above are identified by common reference signs.

The capacitor element 10, along with the anode wire 16, is covered by a protective layer 2, and outside the protective layer 2, the packaging member 3 formed of hard resin such as epoxy resin is formed as a thin-layer cover. The protective layer 2 has a smaller linear expansion coefficient than the packaging member 3, and is formed of low-stress silicone resin or the like.

The packaging member 3 is transfer-molded, by being injected in a melted state into a cavity inside a mold in which the capacitor element 10 is placed, so as to mold the capacitor element 10 and then harden. The contraction of the packaging member 3 during its hardening is absorbed by the elasticity of the protective layer 2, and this suppresses the mechanical stress on the capacitor element 10.

Moreover, the shock resulting from resin injection for the transfer molding of the packaging member 3 is absorbed by the soft protective layer 2, and this suppresses the damage to the capacitor element 10. Thus, it is possible to suppress leakage current resulting from mechanical damage to the capacitor element 10.

In addition, when the anode and cathode terminals 4 and 5 are soldered by reflow soldering or the like, the packaging member 3 and the protective layer 2 expand and contract abruptly. At this time, in a similar manner as described above, the expansion and contraction of the packaging member 3 are absorbed by the elasticity of the protective layer 2, and this suppresses the mechanical stress on the capacitor element 10. Furthermore, since the protective layer 2 has a smaller linear expansion coefficient than the packaging member 3, even if the heat of reflow solder conducts to the solid electrolytic capacitor 1, the protective layer 2 expands less than the packaging member 3, and this prevents the packaging member 3 from rupturing.

Inconveniently, however, according to the solid electrolytic capacitor 1 disclosed in JP-A-H5-136009 mentioned above, the silicone resin or the like used for the protective layer 2—a low-stress one which in addition has a smaller linear expansion coefficient than the hard resin such as epoxy resin forming the packaging member 3—is very expensive. This leads to the problem of the solid electrolytic capacitor 1 requiring an increased cost.

SUMMARY OF THE INVENTION

An object of the present invention is to provide a solid electrolytic capacitor that contributes to suppressed leakage current and reduced cost, and to provide a method for manufacturing such a solid electrolytic capacitor.

To achieve the above object, according to one aspect of the invention, a solid electrolytic capacitor comprises:

a capacitor element having an anode member having a valve action, a cathode layer covering the anode member via a dielectric member, and an anode wire fitted at a terminal lead-out face at one end of the anode member;

an anode terminal joined to the anode wire;

a cathode terminal conductive to the cathode layer;

a protective layer of resin covering part or all of the capacitor element; and a packaging member of resin harder than the protective layer, the packaging member covering around the capacitor element including the protective layer and the anode wire to form a package.

Here, the protective layer has a larger linear expansion coefficient than the packaging member, and the mass ratio of the packaging member to the total mass of the packaging member and the protective layer between the terminal lead-out face and the exterior face of the packaging member opposite the terminal lead-out face is 50% or more.

With this structure, in a capacitor element, on a surface of an anode member formed of a metal or an oxide having a valve action, a dielectric member of an oxide coating or the like is formed, and on a surface of the dielectric member, a cathode layer formed of a solid electrolytic layer such as manganese oxide or organic electrically-conductive polymer is provided. Moreover, in the capacitor element, at one face, referred to as a terminal lead-out face, of the anode member, an anode wire is fitted by planting or welding. An anode terminal such as a lead frame is joined to the anode wire, and a cathode terminal such as a lead frame conductive to the cathode layer is provided. Around the capacitor element, a protective layer of resin is formed, and the protective layer and the anode wire are covered, from around, by resin harder than the protective layer. The protective layer has a larger linear expansion coefficient than the packaging member, and the mass of the packaging member in an anode terminal-side part is 50% or more of the total mass of the packaging member and the protective layer. The shock resulting from resin injection at the time of the transfer-molding of the packaging member, the contraction of the packaging member during its hardening, and the expansion and contraction of the packaging member at the time of the soldering of the anode and cathode terminals are absorbed by the elasticity of the soft protective layer. Moreover, since there is less of the protective layer around the anode wire compared with the packaging member there, it is possible to prevent rupturing of the packaging member resulting from thermal expansion of the protective layer at the time of the soldering of the anode and cathode terminals.

According to the invention, in the solid electrolytic capacitor structured as described above, the protective layer may not be provided between the terminal lead-out face and the exterior face of the packaging member opposite the terminal lead-out face.

According to the invention, in the solid electrolytic capacitor structured as described above, the protective layer may have a dynamic viscoelasticity of 200 MPa or less.

According to the invention, in the solid electrolytic capacitor structured as described above, the protective layer may have a hardness of 90 degrees or less on Durometer A.

According to the invention, in the solid electrolytic capacitor structured as described above, the anode member may contain niobium or an oxide of niobium as a main ingredient.

According to the invention, in the solid electrolytic capacitor structured as described above, the cathode layer may be formed of organic electrically-conductive polymer.

According to the invention, in the solid electrolytic capacitor structured as described above, relative to the volume of the protective layer and the packaging member between the end face of the capacitor element opposite the terminal lead-out face and the exterior face of the packaging member opposite that end face, the volume of the protective layer and the packaging member between the terminal lead-out face and the exterior face of the packaging member opposite the terminal lead-out face is 1.4 or more times that volume.

According to another aspect of the invention, a method for manufacturing a solid electrolytic capacitor comprises:

a step of forming a capacitor element having an anode member having a valve action, a cathode layer covering the anode member via a dielectric member, and an anode wire fitted at a terminal lead-out face at one end of the anode member;

a step of joining an anode terminal to the anode wire;

a step of providing a cathode terminal conductive to the cathode layer;

a step of forming a protective layer of resin covering part or all of the capacitor element; and a step of forming a packaging member of resin harder than the protective layer such that the packaging member covers around the capacitor element including the protective layer and the anode wire to form a package, Here, the protective layer has a larger linear expansion coefficient than the packaging member, and the mass ratio of the packaging member to the total mass of the packaging member and the protective layer between the terminal lead-out face and the exterior face of the packaging member opposite the terminal lead-out face is 50% or more.

According to the present invention, the packaging member is formed of resin harder than the protective layer, the protective layer has a larger linear expansion coefficient than the packaging member, and the mass ratio of the packaging member relative to the total mass of the packaging member and the protective layer between the terminal lead-out face, at which the anode wire is led out, and the exterior face of the packaging member opposite the terminal lead-out face is 50% or more. Thus, it is possible to reduce the cost of the solid electrolytic capacitor. Moreover, the contraction of the packaging member during hardening and the expansion and contraction of the packaging member at the time of the soldering of the anode and cathode terminals are absorbed by the elasticity of the protective layer. Furthermore, the shock resulting from resin injection at the time of the transfer-molding of the packaging member is absorbed by the soft protective layer. Thus, it is possible to suppress leakage current caused by mechanical stress on the capacitor element. In addition, in a terminal lead-out face-side part, while the protective layer and the packaging member covering the anode wire are provided over a wide area, there is less of the protective layer, which has a larger thermal expansion coefficient. Thus, it is possible to prevent rupturing of the packaging member resulting from thermal expansion of the protective layer at the time of soldering.

DESCRIPTION OF REFERENCE SIGNS

1 solid electrolytic capacitor; 2 protective layer; 3 packaging member; 3a, 3b exterior face; 4 anode terminal; 4a anode soldering portion; 5 cathode terminal; 5a cathode soldering portion; 6 adhesive layer; 10 capacitor element; 12 anode member; 12a terminal lead-out face; 13 dielectric member; 14 cathode layer; 15 cathode draw-out layer; 15a end face; 16 anode wire.

DETAILED DESCRIPTION OF PREFERRED EMBODIMENTS

Figure 1:
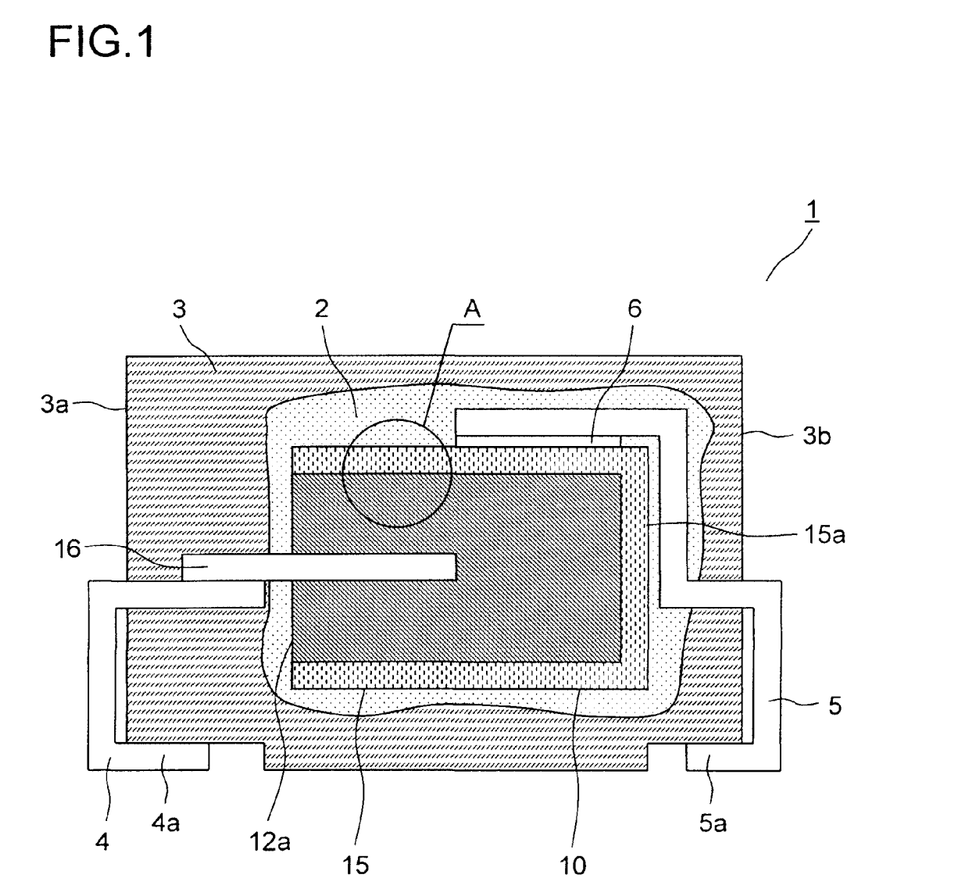
FIG. 1 is a front sectional view of a solid electrolytic capacitor according to a first embodiment of the invention.
Figure 2:
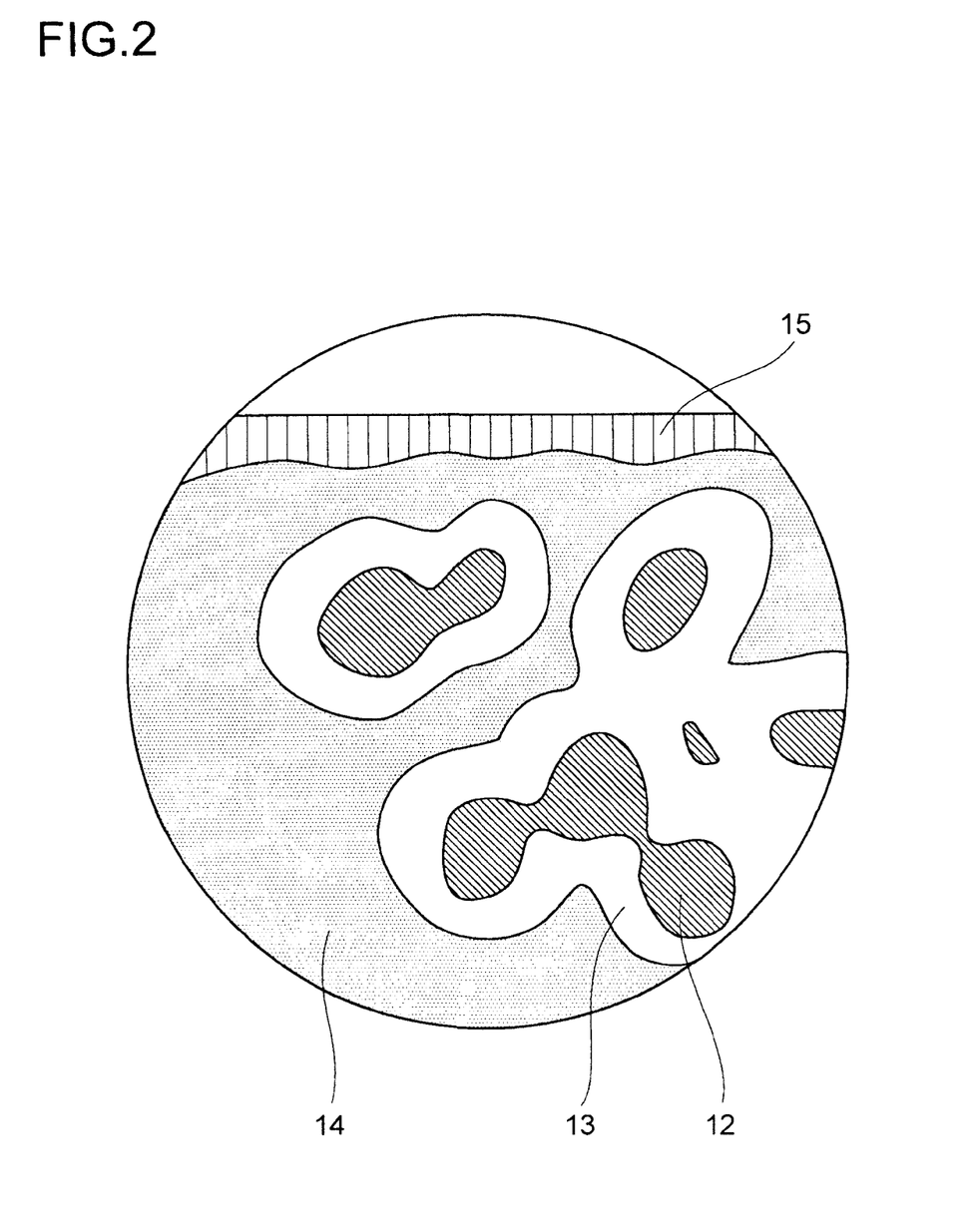
FIG. 2 is an enlarged view of part A in FIG. 1.

Embodiments of the present invention will be described below with reference to the accompanying drawings. For convenience' sake, such parts as find their counterparts in the conventional examples shown in FIGS. 4 and 5 described earlier are identified by common reference signs. FIG. 1 is a front sectional view of a solid electrolytic capacitor according to a first embodiment of the invention. FIG. 2 is an enlarged view of part A in FIG. 1. The solid electrolytic capacitor 1 has a capacitor element 10 covered by a protective layer 2 and by a packaging member 3.

In the capacitor element 10, a porous anode member 12 is formed by molding powder, having an anode wire 16 planted at one end, of a metal or oxide having a valve action—such as tantalum, niobium, and an oxide of niobium—into predetermined dimensions and then subjecting it to high-temperature vacuum sintering. In this way, at one face, referred to as a terminal lead-out face 12a, of the anode member 12, the anode wire 16 is fitted. The anode wire 16 is typically formed of the same material as the anode member 12. The anode wire 16 may instead be electrically welded to the terminal lead-out face 12a of the anode member 12 after its sintering.

Next, the anode member 12 formed of a porous member is subjected to anodic oxidation (chemical conversion treatment) so that a dielectric member 13 formed of an oxide coating is formed over the entire surface to inside the porous member. Next, a cathode layer 14 formed of a solid electrolytic layer such as manganese dioxide or organic electrically-conductive polymer is formed to inside the porous member so as to cover the entire surface of the dielectric member 13.

Next, around the cathode layer 14, a carbon layer and a silver layer are formed one after the other to form a cathode draw-out layer 15; in this way, the capacitor element 10 is obtained. At this time, the cathode draw-out layer 15 is not formed on the terminal lead-out face 12a to avoid short-circuiting.

To the anode wire 16, an anode terminal 4 formed of a lead frame is joined by welding. To the cathode draw-out layer 15, a cathode terminal 5 formed of a lead frame is fitted via an adhesive layer 6 formed of electrically-conductive adhesive. This permits the cathode layer 14 and the cathode draw-out layer 15 to conduct to each other.

Next, except at the tips of the anode and cathode terminals 4 and 5, a protective layer 2 formed of soft resin is applied to around the capacitor element 10, so that the capacitor element 10 is covered by the protective layer 2. At this time, the protective layer 2 may be formed all over the surface of the terminal lead-out face 12a of the anode member 12 and the cathode draw-out layer 15, or part of the protective layer 2 may be omitted. Used for the protective layer 2 formed of soft resin is, for example, silicone resin and epoxy resin.

Next, by transfer molding, the capacitor element 10 is resin-molded by the packaging member 3. Specifically, the capacitor element 10 is placed in a cavity inside a mold (unillustrated), with the anode and cathode terminals 4 and 5 drawn out of the cavity. The packaging member 3 is formed of resin that is, when hardened, harder than the protective layer 2; used for the packaging member 3 is, for example, epoxy resin or the like having an excellent sealing property and resistance to external force.

The resin in a high-viscosity (several hundred to several thousand P), melted state by being thermally melted at high temperature (for example, 180° C.) is injected into the cavity through a fine gate (for example, with an inside diameter of 0.1 mm² or less) under high pressure (several MPa to several tens of MPa). This causes the solid electrolytic capacitor 1 to be covered by the packaging member 3.

At this time, the anode wire 16 is covered by the packaging member 3 simultaneously. Thus, relative to the volume of the protective layer 2 and the packaging member 3 between the end face 15a of the cathode draw-out layer 15 opposite the terminal lead-out face 12a and the exterior face 3b of the packaging member 3 opposite the end face 15a, the volume of the protective layer 2 and the packaging member 3 between the terminal lead-out face 12a and the exterior face 3a of the packaging member 3 opposite the terminal lead-out face 12a is so formed as to be 1.4 or more times that volume.

Then, the anode and cathode terminals 4 and 5 drawn out of the packaging member 3 are cut to predetermined dimensions, and are bent along the packaging member 3, thereby to form an anode soldering portion 4a and a cathode soldering portion 5a. In this way, a chip-type solid electrolytic capacitor 1 is obtained.

The solid electrolytic capacitor 1 is mounted on a circuit board with the anode and cathode soldering portions 4a and 5a soldered by reflow soldering or the like. At this time, the solid electrolytic capacitor 1 receives a thermal shock lasting for about 10 seconds to several minutes at high temperature of about 250° C.

In the solid electrolytic capacitor 1 described above, the protective layer 2 is softer, and thus has a smaller elasticity coefficient, than the packaging member 3; furthermore, used for the protective layer 2 is resin having a larger linear expansion coefficient than the packaging member 3. Moreover, between the terminal lead-out face 12a and the exterior face 3a of the packaging member 3 opposite the terminal lead-out face 12a, relative to the total mass of the packaging member 3 and the protective layer 2, the mass ratio of the packaging member 3 to that total mass is so formed as to be 50% or more.

The soft, large-linear-expansion-coefficient resin used for the protective layer 2 is inexpensive compared with soft, small-linear-expansion-coefficient resin. This helps reduce the cost of the solid electrolytic capacitor 1.

In addition, the volume shrinkage occurring during hardening after the transfer-molding of the packaging member 3 is absorbed by the elasticity of the protective layer 2. Moreover, when the anode and cathode terminals 4 and 5 are soldered by reflow soldering or the like, the packaging member 3 and the protective layer 2 expand and contract abruptly. At this time, the expansion and contraction of the packaging member 3 are absorbed by the elasticity of the protective layer 2. Furthermore, the shock resulting from resin injection at the time of the transfer-molding of the packaging member 3 is absorbed by the soft protective layer 2. Thus, it is possible to suppress current leakage resulting from mechanical stress on the capacitor element 10.

Moreover, so that the joint between the anode wire 16 and the anode terminal 4 may be covered, the volume of the protective layer 2 and the packaging member 3 is larger in a terminal lead-out face 12a-side part of the capacitor element 10 than an end face 15a-side part thereof. As a result, when the anode and cathode soldering portions 4a and 5a are soldered, thermal expansion of the protective layer 2 may cause the packaging member 3 to rupture. However, since, in the terminal lead-out face 12a-side part, there is less of the protective layer 2 compared with the packaging member 3, it is possible to prevent rupturing of the packaging member 3 resulting from thermal expansion of the protective layer 2.

In particular, where, as in this embodiment, the volume of the protective layer 2 and the packaging member 3 in the terminal lead-out face 12a-side part is 1.4 or more times the volume of the protective layer 2 and the packaging member 3 in the end face 15a-side part, increasing the volume of the protective layer 2 in the terminal lead-out face 12a-side part makes the packaging member 3 easier to rupture. Thus, by reducing the protective layer 2 in the terminal lead-out face 12a-side part compared with the packaging member 3 there, it is possible to achieve more effect in preventing rupturing of the packaging member 3.

Moreover, on the other faces than the terminal lead-out face 12a, the protective layer 2 and the packaging member 3 can be formed thin; thus there is less of the protective layer 2 as a whole is small, and thus thermal expansion exerts little effect. This prevents the protective layer 2 from causing the packaging member 3 to rupture.

Figure 3:
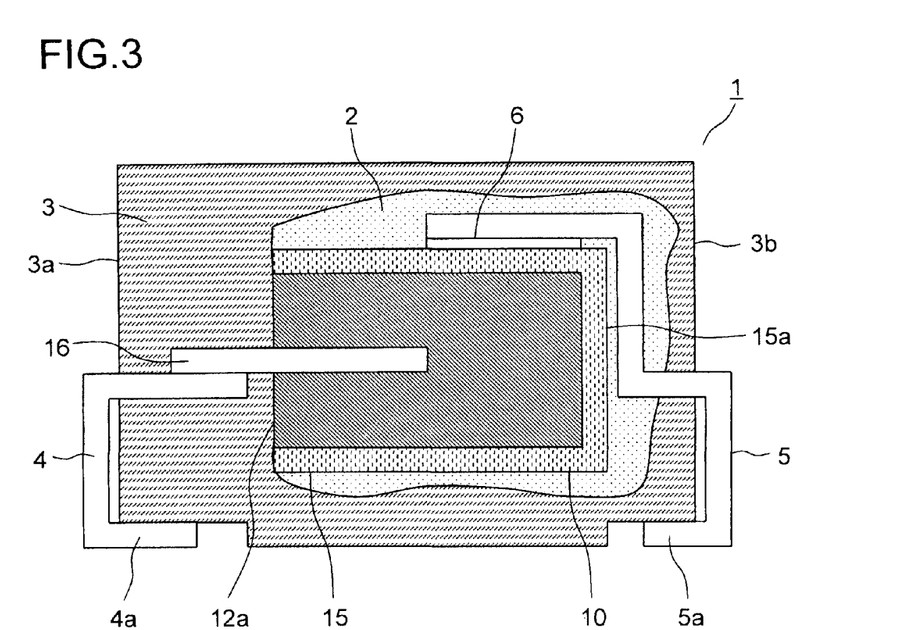
FIG. 3 is a front sectional view of a solid electrolytic capacitor according to a second embodiment of the invention.

Next, FIG. 3 is a front sectional view of a solid electrolytic capacitor 1 according to a second embodiment of the invention. For convenience' sake, such parts as find their counterparts in the first embodiment shown in FIGS. 1 and 2 described previously are identified by common reference signs. In the solid electrolytic capacitor 1 of this embodiment, the protective layer 2 covering the capacitor element 10 is provided on all the peripheral faces other than the terminal lead-out face 12a. That is, between the terminal lead-out face 12a and the exterior face 3a of the packaging member 3 opposite the terminal lead-out face 12a, relative to the total mass of the packaging member 3 and the protective layer 2, the mass ratio of the packaging member 3 to that total mass is so formed as to be 100%. In other respects, the second embodiment is similar to the first embodiment.

When the packaging member 3 is transfer-molded, the gate of the mold is provided on a face of the cavity other than that opposite the terminal lead-out face 12a. Thus, even if the protective layer 2 is not provided on the terminal lead-out face 12a, the shock resulting from resin injection at the time of the transfer-molding of the packaging member 3 can be absorbed by the protective layer 2. Moreover, since the protective layer 2 is not provided in the terminal lead-out face 12a-side part, it is possible to prevent rupturing of the packaging member 3 resulting from thermal expansion of the protective layer 2.

Moreover, since substantially the entire surface of the capacitor element 10 other than the terminal lead-out face 12a is covered by the protective layer 2, the expansion and contraction of the packaging member 3 at the time of transfer-molding and soldering are absorbed by the protective layer 2. Thus, it is possible to suppress mechanical stress on the capacitor element 10.

Table 1 shows the end-product yields achieved when samples of the solid electrolytic capacitor 1 according to the first and second embodiments were manufactured, along with the results of soldering heat resistance tests conducted with them to see the leakage current and the exterior appearance. In each test, one of the resins shown at A to D in Table 2 was used for the protective layer 2, and the resin shown at E in Table 2 was used for the packaging member 3. The resins for the protective layer 2 are all softer, and have a larger linear expansion coefficient, than the resin for the packaging member 3.

In Table 2, the hardness of each resin for the protective layer 2 is given in terms of the reading on Durometer A according to JIS (Japan Industry Standards) K 6253. It should be noted that the measurement accuracy of Durometer A deteriorates significantly over a hardness of 90 degrees. For this reason, for resin D, its elasticity is given in terms of dynamic viscoelasticity as measured on a dynamic viscoelasticity tester (for example, model Q800 manufactured by TA Instruments. Japan). For resin E, its hardness was so high that it could not be measured either on Durometer A or on the dynamic viscoelasticity tester.

Each sample was prepared as follows. As an anode member 12, 60 mg of powder of niobium, having a CV product of 100,000 FV/g, and having an anode wire 16 of niobium planted in it, was sinter-molded, and was then subjected to chemical conversion processing in an aqueous solution of nitric acid at 45 V to form a dielectric member 13 of an oxide coating. Then, as a cathode layer 14, a polypyrrole layer was formed, and furthermore a carbon layer and a silver layer were formed one after the other to form a cathode draw-out layer 15. In this way, a capacitor element 10 was formed.

The capacitor element 10 was resin-spread by a protective layer 2 and then resin-molded by a packaging member 3 to form a solid electrolytic capacitor 1 with exterior dimensions of 7.3 mm×4.3 mm×2.8 mm. Moreover, the volume of the protective layer 2 and the packaging member 3 in a terminal lead-out face 12a-side part of each sample was so formed as to be 1.4 times the volume of the protective layer 2 and the packaging member 3 in an end face 15a-side part thereof. Then, each sample was subjected to a soldering heat resistance test by being treated twice (for four minutes each time) on a soldering reflow simulation test machine with the maximum temperature set at 250° C. (5 seconds).

In Table 1, "Packaging Member Mass Ratio" refers to the mass ratio, as measured between the terminal lead-out face 12a and the exterior face 3a of the packaging member 3 opposite the terminal lead-out face 12a, of the packaging member 3 to the total mass of the packaging member 3 and the protective layer 2. Specifically, samples Nos. 1, 3, 5, 6, and 8 and comparative examples (Comp. Ex.) 3 and 4 have the structure of the first embodiment in which the protective layer 2 is provided on the terminal lead-out face 12a, and samples Nos. 2, 4, and 7 have the structure of the second embodiment in which the protective layer 2 is not provided on the terminal lead-out face 12a. Comparative examples (Comp. Ex.) 1 and 2 have a structure in which no protective layer 2 is provided anywhere over the entire surface of the capacitor element 10. For yields, 200 samples were manufactured under each of the different sets of conditions, and those of them which produced a leakage current of 100 μA or less under application of a rated voltage were taken as acceptable. In the soldering heat resistance tests, 20 samples were tested under each of the different sets of conditions.

The test results show that the yields of comparative examples 1 and 2, having no protective layer 2, are strikingly low. This is because many samples could not be satisfactorily repaired by aging from damage resulting from the impacting shock at the time of injection of epoxy resin for the packaging member 3 and the stress resulting from hardening contraction during hardening of the same resin. Moreover, comparative examples 1 and 2 produced significantly increased leakage currents LC after the soldering heat resistance tests.

In comparative examples 3 and 4, in which the mass ratio of the packaging member 3 in the terminal lead-out face 12a-side part is small (25% and 40% respectively), all or more than half of samples developed rupturing of the packaging member 3 after the soldering heat resistance tests.

By contrast, samples Nos. 1 to 8 all produced far smaller leakage currents LC after the soldering heat resistance tests than comparative example 1 and 2. Moreover, among the total of 160 samples tested, hardly any abnormality in exterior appearance, such as a sign of rupturing of the packaging member 3, after the soldering heat resistance tests was observed. It has thus been confirmed that it is possible to prevent rupturing of the packaging member 3 and to suppress mechanical stress on the capacitor element 10.

Similar results were obtained when the protective layer 2 was formed of resin having a dynamic viscoelasticity of 200 MPa.

While in the samples, niobium was used for the anode member 12, and organic electrically-conductive polymer was used for the cathode layer 14, it is clear that similar effects will be obtained when another material such as tantalum is used for the anode member 12, or when another material such as manganese oxide is used for the cathode layer 14.

However, in particular when niobium or an oxide of niobium is used as a main ingredient for the anode member 12, or when organic electrically-conductive polymer is used for the cathode layer 14, the capacitor element 10 tends to receive mechanical stress.

Specifically, the melting point of niobium is 2470° C., and the melting point of tantalum is 2990° C. Accordingly, the sintering temperature of niobium or an oxide of niobium is lower than that of tantalum, and thus the former, when used for the anode member 2, has lower resistance to mechanical stress. Moreover, organic electrically-conductive polymer has lower resistance to heat than that of manganese dioxide, and thus it, when used for the cathode layer 14, has lower resistance to mechanical stress.

In addition, an increase in leakage current caused by mechanical stress on the capacitor element 10 resulting from the transfer-molding of the packaging member 3 can be repaired by a so-called aging process involving application of a voltage at high temperature. At this time, oxygen atoms are needed to repair a defect part of the dielectric member 13. For this reason, while, when manganese oxide is used for the cathode layer 14, oxygen can be supplied and thus the dielectric member 13 can be repaired, when organic electrically-conductive polymer is used, since it does not contain oxygen, it is difficult to repair the dielectric member 13.

Thus, when the anode member 12 contains niobium or an oxide of niobium as its main ingredient, or when the cathode layer 14 is formed of organic electrically-conductive polymer, by adopting the structures of the first and second embodiments, it is possible to suppress mechanical stress on the capacitor element 10 and achieve more effect.

Although lead frames are used as the anode and cathode terminals 4 and 5 in the first and second embodiments, it is possible to adopt a frameless structure instead.

According to the present invention, it is possible to use, in a solid electrolytic capacitor covered by resin, a capacitor element having a cathode layer formed on a surface of an anode member having a valve action.

What is claimed is:

1. A solid electrolytic capacitor comprising:
   a capacitor element having
   an anode member having a valve action,
   a cathode layer covering the anode member via a dielectric member, and
   an anode wire fitted at a terminal lead-out face at one end of the anode member;
   an anode terminal joined to the anode wire;
   a cathode terminal conductive to the cathode layer;
   a protective layer of resin covering part or all of the capacitor element; and
   a packaging member of resin harder than the protective layer, the packaging member covering around the capacitor element including the protective layer and the anode wire to form a package,
   wherein
   the protective layer has a larger linear expansion coefficient than the packaging member, and
   a mass ratio, as measured between the terminal lead-out face and an exterior face of the packaging member opposite the terminal lead-out face, of the packaging member to a total mass of the packaging member and the protective layer is 50% or more.

2. The solid electrolytic capacitor according to claim 1, wherein the protective layer is not provided between the terminal lead-out face and the exterior face of the packaging member opposite the terminal lead-out face.

3. The solid electrolytic capacitor according to claim 1, wherein the protective layer has a dynamic viscoelasticity of 200 MPa or less.

TABLE 1

| Sample No. | Rated Voltage V | Protective Layer Resin | Packaging Member Mass Ratio % | Yield % | Leakage Current - Initial μA | Leakage Current - After Soldering Heat Resistance Test μA | Exterior Defect After Soldering Heat Resistance Test out of 20 |
|---|---|---|---|---|---|---|---|
| 1 | 10 | A | 70 | 90.0 | 9 | 32 | 0 |
| 2 | 10 | A | 100 | 91.0 | 4 | 39 | 0 |
| 3 | 4 | A | 60 | 95.5 | 23 | 55 | 0 |
| 4 | 4 | A | 100 | 94.5 | 20 | 50 | 0 |
| 5 | 10 | B | 80 | 90.0 | 3 | 27 | 0 |
| 6 | 10 | B | 50 | 90.0 | 8 | 26 | 1 |
| 7 | 10 | C | 100 | 90.5 | 7 | 19 | 0 |
| 8 | 10 | D | 80 | 88.0 | 9 | 46 | 0 |
| Comp Ex. 1 | 10 | (None) | 100 | 73.5 | 17 | 674 | 0 |
| Comp Ex. 2 | 4 | (None) | 100 | 81.0 | 18 | 257 | 0 |
| Comp Ex. 3 | 10 | A | 25 | 91.5 | 3 | 41 | 20 |
| Comp Ex. 4 | 4 | B | 40 | 95.5 | 18 | 48 | 12 |

TABLE 2

| Resin | Type | Manufacturer | Hardness on Durometer A (Degrees) | Dynamic Viscoelasticity (MPa) | Linear Expansion Coefficient (ppm/K) |
|---|---|---|---|---|---|
| A | Silicone Adhesive | Momentive Performance Materials Inc. | 30 | — | 210 |
| B | Silicone Adhesive | Shin-Etsu Chemical Co., Ltd. | 18 | — | 300 |
| C | Silicone Injection Molding Material | Shin-Etsu Chemical Co., Ltd. | 74 | — | 330 |
| D | Liquid Epoxy Sealant | Hitachi Chemical Co., Ltd. | (94) | 92 | 41 |
| E | Solid Epoxy Resin for Transfer Molding | Hitachi Chemical Co., Ltd. | Out Of Measurable Range | Out Of Measurable Range | 12 |

4. The solid electrolytic capacitor according to claim 1, wherein the protective layer has a hardness of 90 degrees or less on Durometer A.

5. The solid electrolytic capacitor according to claim 1, wherein the anode member contains niobium or an oxide of niobium as a main ingredient.

6. The solid electrolytic capacitor according to claim 1, wherein the cathode layer is formed of organic electrically-conductive polymer.

7. The solid electrolytic capacitor according to claim 1, wherein, relative to a volume of the protective layer and the packaging member between an end face of the capacitor element opposite the terminal lead-out face and an exterior face of the packaging member opposite said end face, a volume of the protective layer and the packaging member between the terminal lead-out face and an exterior face of the packaging member opposite the terminal lead-out face is 1.4 or more times said volume.

8. A method for manufacturing a solid electrolytic capacitor, comprising:
   a step of forming a capacitor element having an anode member having a valve action, a cathode layer covering the anode member via a dielectric member, and an anode wire fitted at a terminal lead-out face at one end of the anode member;
   a step of joining an anode terminal to the anode wire;
   a step of providing a cathode terminal conductive to the cathode layer;
   a step of forming a protective layer of resin covering part or all of the capacitor element; and
   a step of forming a packaging member of resin harder than the protective layer such that the packaging member covers around the capacitor element including the protective layer and the anode wire to form a package,
   wherein
   the protective layer has a larger linear expansion coefficient than the packaging member, and
   a mass ratio of the packaging member to a total mass of the packaging member and the protective layer between the terminal lead-out face and an exterior face of the packaging member opposite the terminal lead-out face is 50% or more.

* * * * *